(12) United States Patent
Ninomiya

(10) Patent No.: US 7,808,875 B2
(45) Date of Patent: Oct. 5, 2010

(54) DATA RECORDING APPARATUS

(75) Inventor: Hideyuki Ninomiya, Osaka (JP)

(73) Assignee: Panasonic Corporation, Osaka (JP)

( * ) Notice: Subject to any disclaimer, the term of this patent is extended or adjusted under 35 U.S.C. 154(b) by 1183 days.

(21) Appl. No.: 11/393,741

(22) Filed: Mar. 31, 2006

(65) Prior Publication Data

US 2006/0257105 A1 Nov. 16, 2006

(51) Int. Cl.
*G09B 20/009* (2006.01)
*H04N 7/00* (2006.01)

(52) U.S. Cl. ............... 369/59.25; 369/47.12; 369/53.37; 369/53.21; 386/95

(58) Field of Classification Search ............... 369/53.21, 369/53.37, 47.22, 47.12, 59.25, 30.04, 47.55, 369/124.07; 386/69, 70, 95, 126
See application file for complete search history.

(56) References Cited

U.S. PATENT DOCUMENTS 6,188,650 B1  2/2001  Hamada et al.
6,661,763 B2 *  12/2003  Kurashina et al. ......... 369/59.25
6,876,612 B2 *  4/2005  Yoneyama et al. ...... 369/124.07
2003/0152365 A1 *  8/2003  Nagayama .................... 386/69
2005/0213455 A1 *  9/2005  Takayama ................ 369/53.21

FOREIGN PATENT DOCUMENTS

| CN | 1223437 | 7/1999 |
|----|---------|--------|
| JP | 7-287919 | 10/1995 |
| JP | 2001-250319 | 9/2001 |
| JP | 2001-351363 | 12/2001 |
| JP | 2002-324321 | 11/2002 |

* cited by examiner

*Primary Examiner*—William J Klimowicz
*Assistant Examiner*—Kim-Kwok Chu
(74) *Attorney, Agent, or Firm*—Bacon & Thomas, PLLC.

(57) ABSTRACT

A data recording apparatus automatically displays a GUI for suggesting the finalization process when the apparatus ejects a disk which has not been finalized. Since the user can eject the disk after he determines if he will make the apparatus perform the finalization process, the user, who does not fully understand the meaning of the finalization, even can decide whether he finalizes a recording medium with the DVD-R standard to enable the recording medium to be played in a device of a different standard.

6 Claims, 4 Drawing Sheets

FIG. 4

DO YOU WANT TO FINALIZE THIS DISK?

EXECUTING FINALIZATION : YOU CAN PLAY THE DISK IN DIFFERENT TYPES OF DEVICES, BUT CANNOT RECORD DATA ONTO THE DISK LATER

NO EXECUTING FINALIZATION : YOU CANNOT PLAY THE DISK IN DIFFERENT TYPES OF DEVICES, BUT CAN RECORD DATA ONTO THE DISK LATER

RECORDABLE AMOUNT OF THE DISK : 30 MINUTES

YES    NO

DATA RECORDING APPARATUS

FIELD OF THE INVENTION

The present invention relates to a data recording apparatus; and more particularly, to an apparatus using disk media such as a Digital Versatile Disk (hereinafter referred to as "DVD"), etc., to record the data.

BACKGROUND OF THE INVENTION

Recently, data recording devices using an optical disk such as DVD-RAMs, etc., have been widely used. The standards for the optical disks are divided into a rewritable type and a write-once type, wherein the rewritable type of optical disks are the disks such as DVD-RAMs on which data can be overwritten, and the write-once type of optical disks are the disks such as DVD-Rs and DVD+Rs on which data cannot be deleted once they are recorded.

Although users can record and delete data repeatedly on the rewritable type of recording media, the rewritable type of recording media have low compatibility with various types of DVD players. On the other hand, although the users can record data just once on the write-once type of recording media such as the DVD-R and the DVD+R, the write-once type of recording media have high compatibility with various types of DVD players. The users cannot record data on the write-once type of recording media later by executing a recording termination process so called a finalization process. However, the write-once type can be played in wide-spread DVD players (including recordable DVD players). On this account, most DVD recording and playing devices record data based on the DVD-R standard which has the highest compatibility.

Conventionally, to finalize a disk, 1) the user is required to determine whether or not to perform the finalization process, or 2) the finalization process is performed automatically after data is recorded (see, e.g., Japanese Patent Laid-open Application No. 2002-324321).

However, these conventional arts have problems that the concept of the finalization is difficult to understand and the user cannot play the disk on a different type of a DVD player without the finalization process. Further, a device that finalizes a disk automatically after data have been recorded has a problem that the device finalizes the disk with plentiful recordable amount left which cannot be used to record additional data.

SUMMARY OF THE INVENTION

It is, therefore, a primary object of the present invention to provide an apparatus which determines whether or not a disk has been finalized when the disk is ejected, and displays a screen for receiving commands regarding the finalization from the user by adding a GUI (Graphical User Interface), etc., on a display screen if the disk has not been finalized.

It is another object of the present invention to provide an apparatus which enables the user to decide whether or not to finalize the disk by providing an explanatory notes related to the finalization, or information about the recordable amount left on the disk, etc.

It is still another object of the present invention to provide an apparatus which ejects the disk when a predetermined time period has passed if the GUI has not received any command from the user instructing whether or not to finalize the disk.

It is still another object of the present invention to provide an apparatus which ejects the disk without performing the finalization process in response to a command input for ejecting the disk from the user again if the GUI has not received any command from the user instructing whether or not to finalize the disk.

In accordance with the present invention, there is provided a data recording apparatus which records data on a recording medium, the apparatus including a user input unit for receiving a user command; a recording medium control unit which controls ejection of the recording medium; a determination unit which determines whether or not the recording medium has been finalized; and a screen information adding unit for adding information on a display unit, wherein when a command for ejecting the recording medium is inputted into the user input unit, the determination unit determines whether or not the recording medium has been finalized, and the screen information adding unit displays information regarding a finalization command on the display unit if the recording medium has not been finalized.

As described above, in accordance with the present invention, even the user who does not fully understand what the finalization of the DVD is, can decide whether or not to finalize the disk before ejecting the disk. Therefore, it is possible to solve the problem that a different DVD player cannot play the disk.

BRIEF DESCRIPTION OF THE DRAWINGS

The above and other objects and features of the present invention will become apparent from the following description of preferred embodiments given in conjunction with the accompanying drawings, in which:

FIG. 4 offers an exemplary GUI screen which a data recording apparatus in accordance with a preferred embodiment of the present invention displays in case of a disk ejection.

DETAILED DESCRIPTION OF THE PREFERRED EMBODIMENTS

Hereinafter, a data recording apparatus in accordance with the preferred embodiment of the present invention will be described with reference to the accompanying drawings.

Figure 1:
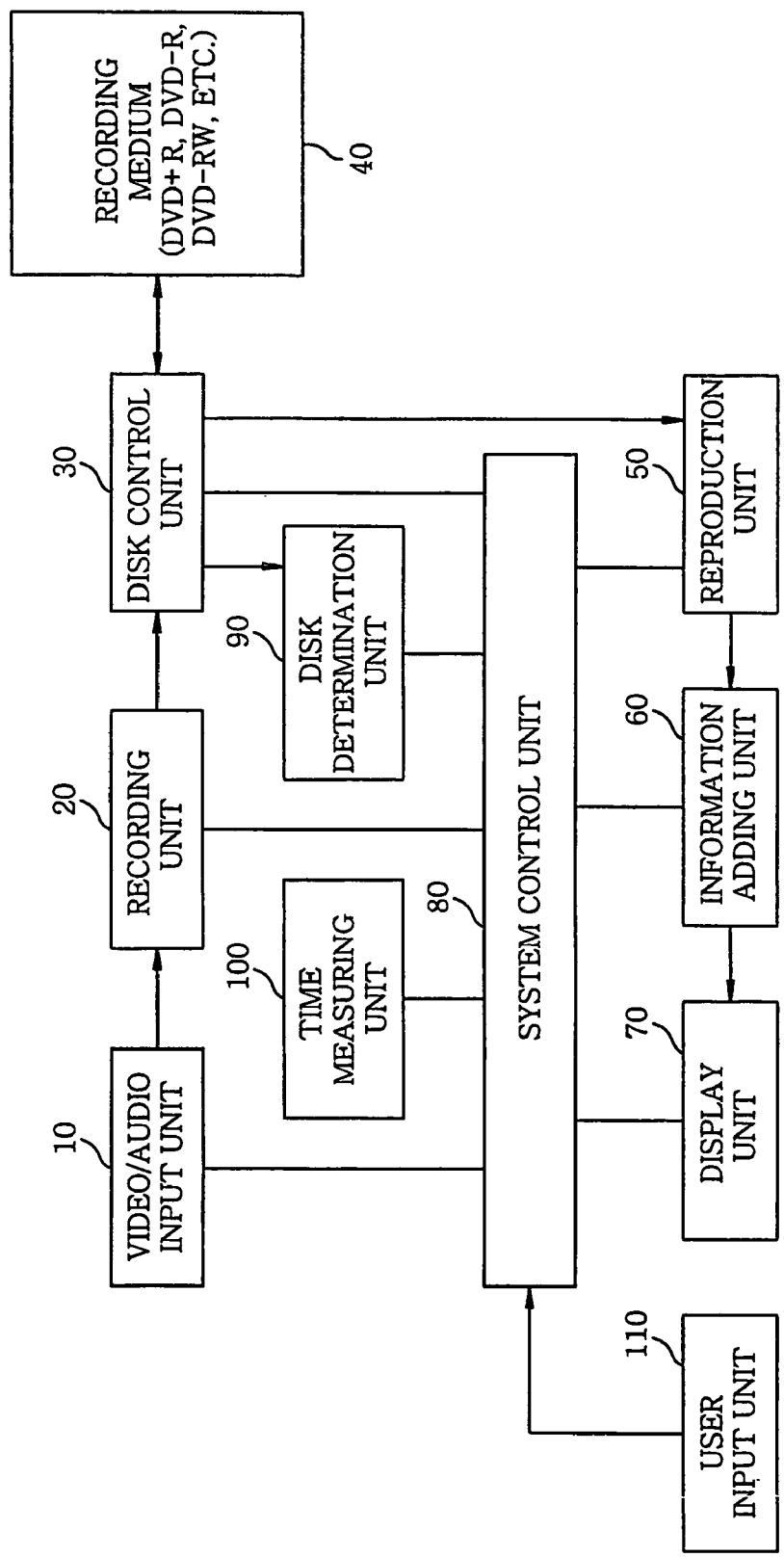
FIG. 1 is a block diagram representing a structure of a data recording apparatus in accordance with a preferred embodiment of the present invention.

FIG. 1 is a block diagram representing a structure of a data recording apparatus in accordance with a preferred embodiment of the present invention. The data recording apparatus in accordance with the embodiment includes a data input unit of video/audio, etc. 10, a recording unit 20, a disk control unit 30, a reproduction unit 50, an information adding unit 60, a display unit 70, a system control unit 80, a disk determination unit 90, a time measuring unit 100, and a user input unit 110. Although the data recording apparatus in accordance with the embodiment includes all types of devices which are able to record and play various DVD media as external recording media, the write-once type of optical disks such as DVD-Rs, DVD+Rs, etc. will be mainly described below.

First, the operation of the apparatus when data such as video/audio, etc. is recorded will be explained. When a command for recording data is inputted into the user input unit 110 from the user, the system control unit 80 analyzes the command and output control signals for recording data to the corresponding units. Thereafter, the video/audio, etc., data inputted into the video/audio input unit 10 is compressed through a coding process by the recording unit 20 and is recorded on the recording medium 40 such as the DVD-R, DVD+R, etc. by the disk control unit 30.

Hereinafter, the operation when the data recorded on the recording medium 40 are reproduced will be described. When a command for reproducing data is inputted into the user input unit 110 from the user, the system control unit 80 outputs control signals for reproducing data to the corresponding units. Then, the disk control unit 30 reads the data from the recording medium 40 to provide them to the reproduction unit 50, and the reproduction unit 50 decodes the coded data to output them to the display unit 70 via the information adding unit 60. At this time, the information adding unit 60 may add information on a display screen for the data to be reproduced so that the display screen overlapped by the information can be displayed on the display unit 70.

Next, the flow of the process when the user attempts to eject a disk will be described with reference to FIG. 1 and FIG. 2 which illustrates a preferred embodiment of the operation of the data recording apparatus.

When the command for ejecting the disk is inputted from the user in step S200, the system control unit 80 makes the disk determination unit 80 determine whether or not the recording medium 40 has been finalized in step S201 before outputting control signals for ejecting the recording medium, i.e., the disk to the disk control unit 30.

That is, the disk determination unit 90 determines whether or not the recording medium 40 has been finalized based on information in the disk which the disk control unit 30 has read from the recording medium 40. The information in the disk which is necessary to determine whether or not the recording medium 40 has been finalized may be whether or not VMG (Video Manager) exists in the logical data structure of the DVD video disk (see, e.g., DVD Specifications for Read-Only Disc Part 3; Version 1.0).

Here, the VMG is the information included in the DVD video zone which is one of parts of memory devices constituting a DVD disk. The VMG has copyright information about the recorded data, information for copy permission, and information for language code, etc. Existence of the VMG means that the finalization process has been already completed, and non-existence of the VMG means that the finalization process has not been performed yet.

In step S201, if the result of the determination whether or not the disk has been already finalized turns out to be "YES" in step S201, the system control unit 80 makes the disk control unit 30 open a tray and eject the disk 40 in step S207.

On the contrary, when the disk 40 has not been finalized, the system control unit 80 makes the information adding unit 60 add the information that asks the user if it will perform the finalization process to the display screen to be displayed by the display unit 70 in step S202. An example of the screen illustrating the information regarding the finalization command is shown in FIG. 4. To help the user to decide whether or not to execute the finalization process, this screen can additionally display information, for example, the meaning of the finalization and the recordable amount left on the disk for additional recording, etc.

Thereafter, the system control unit 80 determines whether or not the command for the finalization has been inputted from the user through the user input unit 110 via the screen for the finalization command in step S203. If the command for the finalization is inputted from the user ("YES" in step S203), the system control unit 80 determines whether the user's command is to execute the finalization process in step S205.

If the user's command is not to execute the finalization process ("NO" in step S205), the system control unit 80 does not execute the finalization process, and opens the tray to eject the disk via the disk control unit 30 without performing the finalization process in step S207. On the other hand, when the user's command is to execute the finalization process ("YES" in step S205), the system control unit 80 performs the finalization process in step S206, opens the tray, and ejects the disk 40 in step S207, via the disk control unit 30.

In the mean time, if the user's command for the finalization is not inputted in step S203 ("NO" in step S203), the system control unit 80 may halt while displaying the input-prompt screen. To avoid such situation, the system control unit 80 measures the display time for which the information regarding the finalization command is being displayed on the display screen by the time measuring unit 100 in FIG. 1 in step S202. If the display time is not longer than a predetermined time period ("NO" in step S204), the system control unit 80 waits for the command input for the finalization from the user. On the contrary, if the display time is longer than the predetermined time period ("YES" in step S204), the system control unit 80 removes the GUI automatically and ejects the disk.

The process of measuring the display time by the time measuring unit 100 can be exemplified as follows. The system control unit 80 instructs the information adding unit 60 to add the GUI for the finalization command on the display screen, and at the same time instructs the time measuring unit 100 to start measuring the display time. After the predetermined time period has elapsed, the time measuring unit 100 informs the system control unit 80 that the predetermined time period has passed. In this case, the system control unit 80 instructs the information adding unit 60 to stop displaying the GUI for the finalization command on the display screen, opens the tray, and ejects the recording medium 40.

Figure 3:
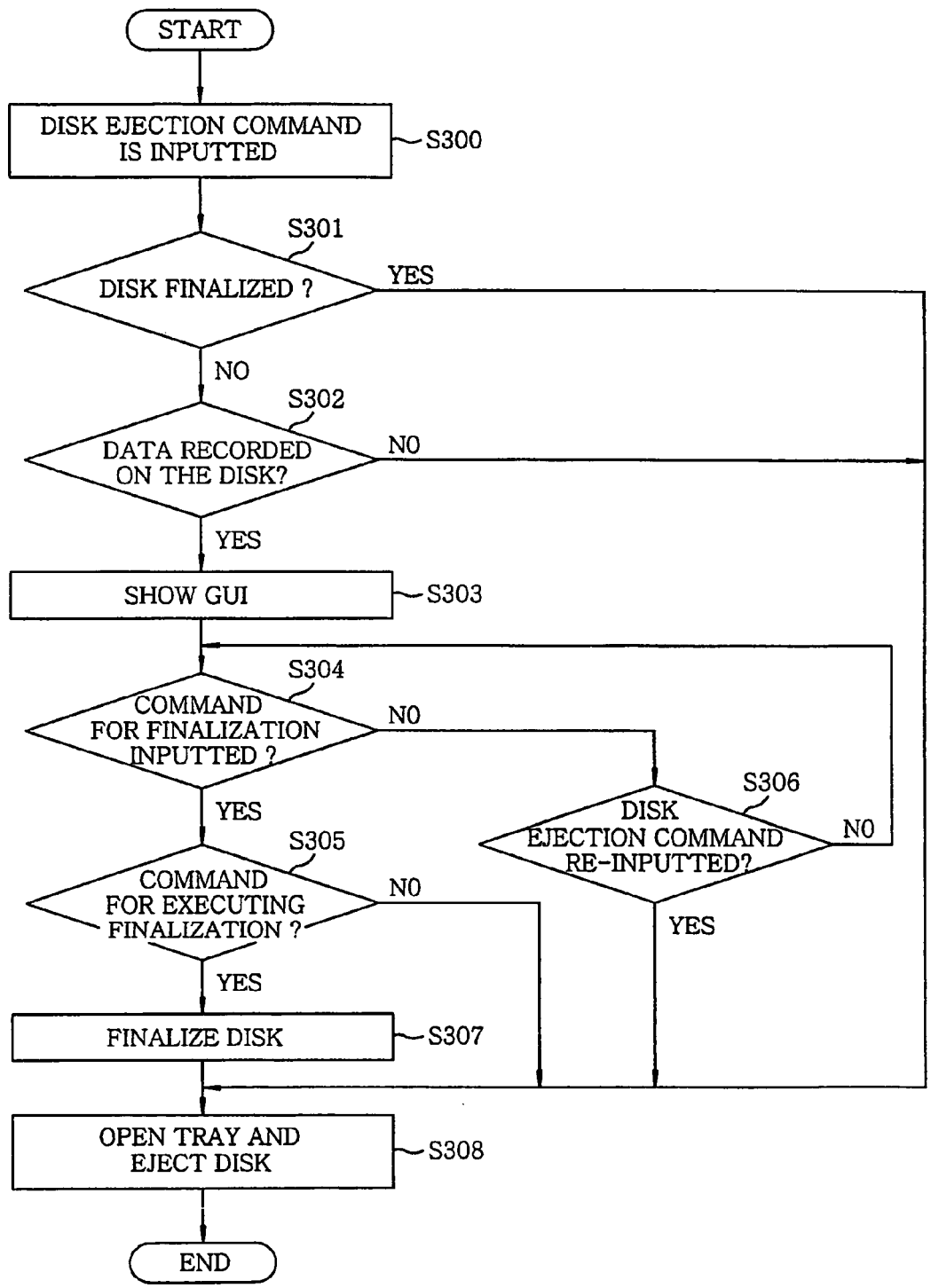
FIG. 3 presents a flowchart illustrating a process in which a data recording apparatus in accordance with another preferred embodiment of the present invention performs a disk ejection.

FIG. 3 shows another embodiment of the process carried out when the data recording apparatus ejects the disk. In the embodiment of FIG. 3, the disk determination unit 90 determines whether or not the recording medium 40 has been finalized in step S301, and opens the tray and ejects the disk 40 if the finalization process has been already performed ("YES" in step S301) in step S308. On the other hand, if the finalization process has not been performed ("NO" in step S301), the disk determination unit 90 additionally carries out the step S302 for determining whether or not the data is recorded on the recording medium 40.

If the data is not recorded on the recording medium 40 ("NO" in step S302), the system control unit 80 opens the tray and ejects the disk. Otherwise, the system control unit 80 displays the GUI on the display unit 70 via the information adding unit 60 asking the user whether it should perform the finalization process.

If there is no command for the finalization from the user ("NO" in step S304), the system control unit 80 checks if it has received the command for ejecting the disk from the user again in step S306. If the system control unit 80 has not received the command for ejecting the disk again ("NO" in step S306), the process goes back to step S304 and waits for the input of the finalization command from the user. If the system control unit 80 has received the command for ejecting the disk again ("YES" in step S306), it opens the tray and ejects the disk without performing the finalization process in step S308.

Figure 2:
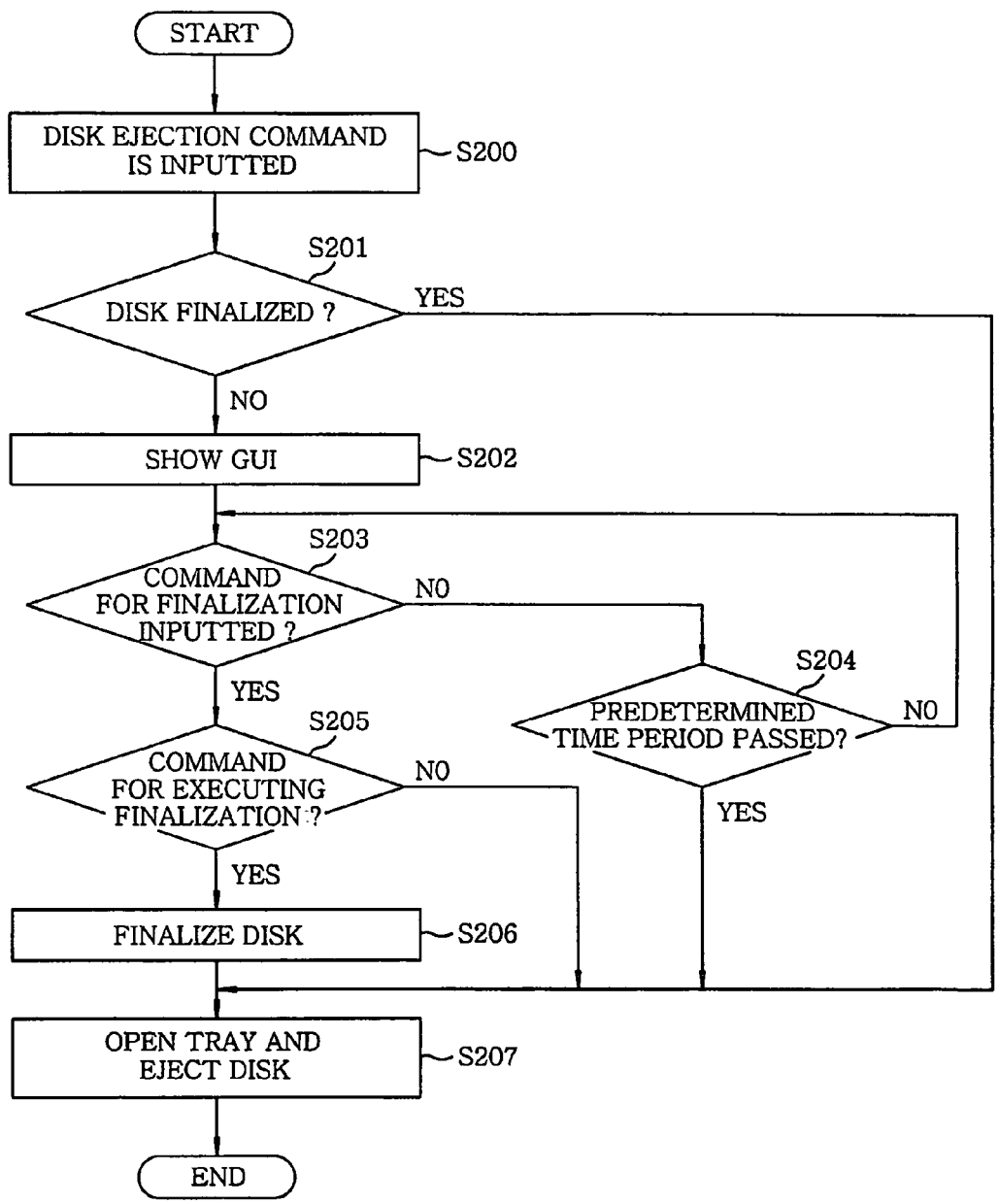
FIG. 2 shows a flowchart describing a process in which a data recording apparatus in accordance with a preferred embodiment of the present invention executes a disk ejection.

The steps S300, S305, S307, and S308 except the steps described herein are identical to the steps S200, S205, S206, and S207 of the preferred embodiment represented in FIG. 2, respectively.

Although the apparatus which can record and reproduce data has been mainly described so far, it is obvious to those skilled in the art that the invention is also applicable to an apparatus for recording data only.

While the invention has been shown and described with respect to the preferred embodiments, it will be understood by those skilled in the art that various changes and modifications may be made without departing from the spirit and scope of the invention as defined in the following claims.

What is claimed is:

1. A data recording apparatus which records data on a recording medium, comprising:
    a user input unit for receiving a user command;
    a recording medium control unit which controls ejection of the recording medium;
    a determination unit which determines whether or not the recording medium has been finalized; and
    a screen information adding unit for adding information to a display unit,
    wherein when a command for ejecting the recording medium is inputted into the user input unit, the determination unit determines whether or not the recording medium has been finalized, and the screen information adding unit adds information regarding a finalization command to the display unit if the recording medium has not been finalized,
    wherein the data recording apparatus further comprises a time measuring unit which measures a display time during which the information regarding the finalization command is displayed on the display screen,
    wherein when the display time measured by the time measuring unit is longer than a predetermined time period after the information regarding the finalization command was displayed on the display unit, the recording medium is ejected by the recording medium control unit, and
    wherein the finalization command includes information that asks if a finalization process will be executed.

2. The apparatus of claim 1, wherein the determination unit determines a recordable amount left on the recording medium, and the screen information adding unit shows the recordable amount left on the recording medium determined by the determination unit on the display unit together with the information regarding the finalization command.

3. The apparatus of claim 1, wherein the screen information adding unit displays an explanatory notes related to finalization on the display unit together with the information regarding the finalization command.

4. The apparatus of claim 1, wherein the determination unit further determines whether or not the data is recorded on the recording medium, and only if the data is recorded on the recording medium and the recording medium has not been finalized, the screen information adding unit displays the information regarding the finalization command on the display unit.

5. The apparatus of claim 1,
    wherein if an additional command for ejecting the recording medium is inputted into the user input unit while the information regarding the finalization command is displayed on the display unit, the recording medium is ejected without being finalized.

6. The apparatus of claim 1, wherein the data includes video and/or audio signal.

* * * * *

UNITED STATES PATENT AND TRADEMARK OFFICE
CERTIFICATE OF CORRECTION

PATENT NO. : 7,808,875 B2
APPLICATION NO. : 11/393741
DATED : October 5, 2010
INVENTOR(S) : Hideyuki Ninomiya It is certified that error appears in the above-identified patent and that said Letters Patent is hereby corrected as shown below:

On the Title Page, insert item [30] Foreign Application Priority

--May 10, 2005  (JP).............................. 2005-137010--

Signed and Sealed this
Twentieth Day of March, 2012

David J. Kappos
*Director of the United States Patent and Trademark Office*